Patented May 10, 1932

1,857,520

UNITED STATES PATENT OFFICE

HERBERT G. STONE, OF KINGSPORT, TENNESSEE, ASSIGNOR TO EASTMAN KODAK COMPANY, OF ROCHESTER, NEW YORK, A CORPORATION OF NEW YORK

PURIFICATION OF SODIUM ACETATE

No Drawing.  Application filed July 2, 1928.  Serial No. 290,053.

This invention relates to a process for the manufacture and purification of sodium acetate. One object of this invention is the purification of sodium acetate which has been obtained from the neutralization of pyroligneous acid liquor, or other acid solutions containing similar empyreumatic impurities. A further object is to facilitate the manufacture of sodium acetate from the crude acetic acid solution obtained in the destructive distillation of wood, and from other crude acetic acid solutions containing similar empyreumatic impurities. Other objects will hereinafter appear.

It has long been known that sodium acetate may be produced from pyroligneous acid, though the methods employed for the production of a sodium acetate of sufficient purity for utilization in subsequent manufacturing processes have been laborious, expensive and inefficient from a yield standpoint.

Various methods involving the purification of sodium acetate solutions obtained by crystallization have been proposed with varying success. The segregation of sodium acetate crystals from neutralized pyroligneous acid is difficult, and the crystals produced are impure and contain quantities of tarry and waxy bodies.

In general, my process comprises a neutralization with sodium carbonate or caustic soda of pyroligneous acid liquor or similar solutions containing empyreumatic impurities; the concentration of the sodium acetate solution thereby obtained by suitable means until the crude tarry product is substantially dry; the purifying step involving heating of the crude sodium acetate in a closed chamber at elevated temperatures by which all the tarry matter is completely charred or carbonized without substantial injury to the sodium acetate contained in the crude mixture.

In working with the liquors obtained from the destructive distillation of wood, I have noted that the only wood tars and oils which form pitch when distilled at a temperature in or about the range of 200° to 300° C., are the settled tars containing those bodies insoluble in the crude pyroligneous solutions. When any of the dissolved tars or oils, such as those commercially known as copper still tar or heavy neutral oil, and light acid oil, are distilled at elevated temperatures, the residue cokes leaving a pyrophoric carbon free from tarry bodies. I, therefore, assumed that the other empyreumatic impurities comprising the tars and oils left in solution in the neutral acetate solution, belonged to the "coking" class of impurities, and it, therefore, followed that the heating of the crude sodium acetate at temperatures of 200° to 300° C., would effectively char or carbonize the tarry and oily bodies and produce a mixture of sodium acetate and carbon.

By the process and method outlined above I have been able to produce an excellent crude sodium acetate from pyroligneous acid liquor by the simple steps of neutralization, concentration, and carbonizing. This crude product may be leached with water, concentrated again and suitably dried to obtain a very pure sodium acetate, suitable for use in any of the various arts requiring acetate of soda. However, the crude sodium acetate produced by the carbonizing operation, containing as it does only carbonaceous impurities, is suitable for many uses without further purification steps.

I am aware that other types of waste liquors containing sodium acetate and impurities of types other than those here considered have been purified by somewhat analogous methods, but it has not heretofore been realized that the tarry bodies resulting from wood distillation and constituting a particularly undesirable type of impurity could be obviated by the process here described.

The charred or carbonized product, when leached, but without further purification steps, has been found to be sufficiently pure for purposes for which crystallized or substantially pure sodium acetate was formerly thought necessary.

In the carrying out of my process it is desirable and necessary to conduct the carbonizing operation in a closed or vented apparatus in an atmosphere of non-reactive gases. It is impractical to purify crude sodium acetate by heating it on an open hearth or in any type of open vessel, unless precautions are taken to exclude an oxidizing atmosphere, or an atmosphere containing quantities of carbon dioxide from coming in contact with the heated materials. Any suitable apparatus heated externally or internally may be employed, though the apparatus must be of the closed type and arranged for careful temperature control. I have found that the carbonizing operation may be conducted at either atmospheric pressure, sub-atmospheric pressure, or at pressures greater than atmospheric.

While the operation of the process involved in my invention is capable of embodiment in many different forms, for the purpose of illustration, I shall set forth and describe the following forms of my invention, but it will be understood that the present invention will not be limited by the following examples except as required by the scope of the claims.

*Example 1.*—Pyroligneous acid which has been previously settled and distilled to remove tars, and which has been demethanolized in a suitable still, is neutralized with sodium carbonate. This neutral solution is evaporated in a suitable evaporator to a high concentration; e. g., 30° Bé., and is then carried to a low moisture content on a drum drier. The dried crude sodium acetate is then placed in an agitated, closed, but vented vessel, externally heated with suitable media; e. g., high pressure hot water, and the temperature of the material is maintained at 260° C. for eight hours, while agitation of the material is maintained to evenly and thoroughly distribute the heating. During the heating period, water vapors, oil vapors and non-condensable gases are liberated through the vent. At the end of the heating period the carbonized product is discharged from the heating vessel into tight containers, by which it is conducted to other manufacturing processes, or to the leaching tanks for further purification. The carbonized material will be found to contain about 93% sodium acetate, 1% sodium carbonate, and 6% carbon.

*Example 2.*—Pyroligneous acid, which has been previously settled and distilled to remove tars, is neutralized with either sodium carbonate or caustic soda. The neutralized solution is concentrated in a suitable evaporator, the distillate being condensed and subsequently fractionated for the production of methanol. The concentrated sodium acetate solution is dried in any suitable type drier, and the dried product is transferred to a carbonizing apparatus, such as that described in Example 1, except that by means of a vacuum pump the pressure is reduced to about 100 mm., which pressure is maintained throughout the carbonizing operation.

The temperature is maintained at 260° C. to 280° C. for from eight to twelve hours, and the residue is then discharged from the carbonizing apparatus into suitable containers.

As above stated, the crude carbonized sodium acetate is of sufficient purity for numerous chemical processes. However, if sodium acetate of substantially 100% purity is desired, it may be produced as follows:

*Example 3.*—Demethanolized pyroligneous acid liquor is neutralized with sodium carbonate and evaporated to 28° Bé. This concentrated solution is further dried on a suitable drier and then placed in a closed but vented chamber and heated at a carefully regulated temperature, ranging from 250° to 280° C. At the end of ten hours, when the carbonizing operation will be found to be practically complete, the carbonized product is discharged into a tank of water and the sodium acetate leached from the carbonized mass. Upon filtering, a solution of sodium acetate is obtained, which may be concentrated and crystallized for exceptionally pure sodium acetate crystals, or it may be concentrated and finally dried to obtain a sodium acetate, substantially free from water and impurities.

In this specification and in the claims where I refer to "carbonizing," such as the "carbonized product", the "carbonizing operation" or the "carbonizing apparatus", it will be understood that I am referring to the carbonizing or charring or other reduction to carbon of the tarry, oily or other empyreumatic impurities contained in the dried crude sodium acetate which results from the concentration of the neutralized pyroligneous acid liquor.

Having thus described my invention, what I claim as new and desire to secure by Letters Patent is:

1. The process of purifying sodium acetate containing empyreumatic impurities, which comprise the steps of concentrating and drying the sodium acetate solution, and then subjecting the dried crude sodium acetate to a temperature of about 200° C. to about 300° C., in a closed but vented chamber at atmospheric pressure.

2. The process of purifying sodium acetate produced by neutralization of the distillate obtained from the destructive distillation of wood, which comprises the steps of concentrating and drying the said sodium acetate, and then heating the dried crude sodium acetate in a closed chamber at temperatures above 200° C. but below the fusion point of the sodium acetate until the empyreumatic impurities contained therein are charred.

3. The process of removing empyreumatic impurities from sodium acetate obtained by the concentration and drying of neutralized pyroligneous liquor that comprises submitting the dried residue to a temperature about 200° to about 300° in an atmosphere free from reactive gases for a period of time sufficient to char the said impurities.

4. The method of removing empyreumatic impurities from sodium acetate obtained by the concentration and drying of neutralized pyroligneous liquor that comprises submitting the dried residue to a temperature about 200 to about 300° C. in an atmosphere free from reactive gases for a period of time sufficient to char the said impurities and then leaching the resultant mass with water and thereby separating the carbonaceous material therefrom.

5. The process of manufacturing purified sodium acetate that comprises neutralizing with a strong alkaline sodium compound a pyroligneous acid liquor containing the empyreumatic impurities from wood distillation, evaporating said liquor to dryness, carbonizing the residue at a temperature about 200 to about 300° C. in an atmosphere free from reactive gases until the impurities are charred, leaching the resultant mass with water and thereby separating the carbonaceous material therefrom, filtering the mass and concentrating and drying the filtrate.

6. In the process of purifying crude sodium acetate, the step which comprises subjecting dried sodium acetate containing empyreumatic impurities to a temperature above 200° C. but below the fusion point of the sodium acetate in an atmosphere free from reactive gases until the empyreumatic impurities contained therein are charred.

Signed at Kingsport, Tennessee, this 25th day of June, 1928.

HERBERT G. STONE.